(12) United States Patent
Suzuki

(10) Patent No.: US 7,401,287 B2
(45) Date of Patent: Jul. 15, 2008

(54) DEVICE, METHOD, AND COMPUTER PROGRAM PRODUCT FOR GENERATING INFORMATION OF LINK STRUCTURE OF DOCUMENTS

(75) Inventor: Akira Suzuki, Yokohama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 463 days.

(21) Appl. No.: 10/862,392

(22) Filed: Jun. 8, 2004

(65) Prior Publication Data

US 2005/0120292 A1 Jun. 2, 2005

(30) Foreign Application Priority Data

Nov. 28, 2003 (JP) ............................ 2003-398989

(51) Int. Cl.
*G06F 17/00* (2006.01)

(52) U.S. Cl. .................................... 715/208

(58) Field of Classification Search ................ 715/500, 715/513, 501.1, 200, 207, 208, 234
See application file for complete search history.

(56) References Cited

U.S. PATENT DOCUMENTS

| | | | | |
|---|---|---|---|---|
| 5,355,472 | A * | 10/1994 | Lewis | 707/101 |
| 5,812,769 | A * | 9/1998 | Graber et al. | 709/228 |
| 6,212,533 | B1 * | 4/2001 | Tabuchi | 715/501.1 |
| 6,237,046 | B1 * | 5/2001 | Ohmura et al. | 710/1 |
| 6,253,204 | B1 * | 6/2001 | Glass et al. | 707/102 |
| 6,336,123 | B2 * | 1/2002 | Inoue et al. | 715/501.1 |
| 6,381,637 | B1 * | 4/2002 | Kamada | 709/218 |
| 6,401,077 | B1 * | 6/2002 | Godden et al. | 705/26 |
| 6,505,212 | B2 * | 1/2003 | Nakano et al. | 707/200 |
| 6,549,944 | B1 * | 4/2003 | Weinberg et al. | 709/224 |
| 6,571,295 | B1 * | 5/2003 | Sidana | 709/246 |
| 6,578,078 | B1 * | 6/2003 | Smith et al. | 709/224 |
| 6,662,218 | B2 * | 12/2003 | Mighdoll et al. | 709/219 |
| 6,986,138 | B1 * | 1/2006 | Sakaguchi et al. | 718/105 |

(Continued)

FOREIGN PATENT DOCUMENTS

JP A 4-321144 11/1992

(Continued)

OTHER PUBLICATIONS

Halkidi et al., Thesus: Organizing Web Document Collections based on Link Semantics, the VLDB Journal, Sep. 17, 2003, pp. 320-332.*

(Continued)

*Primary Examiner*—Cong-Lac Huynh
(74) *Attorney, Agent, or Firm*—Oliff & Berridge, PLC

(57) ABSTRACT

A document link structure generation device for generating link structure information indicating a link structure formed by web documents detects links among web documents by repeating a process for detecting a link description in a web document and a retrieval process for retrieving a web document at a link destination indicated in the link description, and, when a redirection from a web document at a link destination indicated in the link description in the web document to another web document is detected during the retrieval process, adds, to the link structure information, information indicating a link from the web document containing the link description to the another web document which is the destination of the redirection.

13 Claims, 8 Drawing Sheets

| LINK SOURCE | LINK DESTINATION | REAL LINK | EFFECTIVE DELETION | VIRTUAL LINK |
|---|---|---|---|---|
| A | B | EXISTENT | PRESENT | NON-EXISTENT |
| A | D | EXISTENT | ABSENT | NON-EXISTENT |
| D | E | EXISTENT | ABSENT | NON-EXISTENT |
| D | F | EXISTENT | PRESENT | NON-EXISTENT |
| ⋮ | ⋮ | ⋮ | ⋮ | ⋮ |
| A | C | NON-EXISTENT | — | EXISTENT |
| D | H | NON-EXISTENT | — | EXISTENT |

131    133    135    137    139

U.S. PATENT DOCUMENTS

| | | | |
|---|---|---|---|
| 7,131,069 B1 * | 10/2006 | Rush et al. | 715/738 |
| 7,181,682 B1 * | 2/2007 | Manson | 715/513 |
| 7,257,598 B2 * | 8/2007 | Toivonen et al. | 707/102 |
| 2001/0027476 A1 * | 10/2001 | Kido | 709/206 |
| 2001/0054184 A1 * | 12/2001 | Watanabe et al. | 725/59 |
| 2002/0059272 A1 * | 5/2002 | Porter | 707/100 |
| 2002/0147788 A1 * | 10/2002 | Nguyen | 709/217 |
| 2002/0147805 A1 * | 10/2002 | Leshem et al. | 709/223 |
| 2002/0161680 A1 * | 10/2002 | Tarnoff | 705/35 |
| 2003/0120639 A1 * | 6/2003 | Potok et al. | 707/3 |
| 2003/0158953 A1 * | 8/2003 | Lal | 709/230 |
| 2003/0191737 A1 * | 10/2003 | Steele et al. | 707/1 |
| 2003/0194689 A1 * | 10/2003 | Kamasaka et al. | 434/350 |
| 2003/0208482 A1 * | 11/2003 | Kim et al. | 707/3 |
| 2004/0019676 A1 * | 1/2004 | Iwatsuki et al. | 709/224 |
| 2004/0024848 A1 * | 2/2004 | Smith et al. | 709/219 |
| 2004/0073705 A1 * | 4/2004 | Madril et al. | 709/245 |
| 2004/0088438 A1 * | 5/2004 | Madril et al. | 709/250 |
| 2004/0122848 A1 * | 6/2004 | Toivonen et al. | 707/102 |
| 2004/0187076 A1 * | 9/2004 | Ki et al. | 715/513 |
| 2004/0236754 A1 * | 11/2004 | Workman et al. | 707/10 |
| 2004/0237027 A1 * | 11/2004 | Wakita et al. | 715/500 |
| 2005/0049939 A1 * | 3/2005 | Lai et al. | 705/27 |
| 2005/0050029 A1 * | 3/2005 | Suzuki | 707/3 |
| 2005/0149873 A1 * | 7/2005 | Guido et al. | 715/734 |
| 2005/0165778 A1 * | 7/2005 | Obata et al. | 707/5 |
| 2005/0256874 A1 * | 11/2005 | Chiba et al. | 707/10 |
| 2005/0262089 A1 * | 11/2005 | Wu | 707/10 |
| 2006/0048049 A1 * | 3/2006 | Sholl | 715/513 |
| 2006/0106847 A1 * | 5/2006 | Eckardt et al. | 707/101 |
| 2006/0259640 A1 * | 11/2006 | Bonsma | 709/245 |

FOREIGN PATENT DOCUMENTS

| | | | |
|---|---|---|---|
| JP | A 6-149648 | 5/1994 | |
| JP | A 10-222415 | 8/1998 | |

OTHER PUBLICATIONS

Calado et al., Cobining Link-Based and Content-Based Methods for Web Document Classification, ACM 2003, pp. 394-401.*

Mak et al., Dynamic Structuring of Web Information to Access Visualization, ACM 2002, pp. 778-784.*

Ciancarini et al., XlinkProxy : External Linkbases with Xlink, ACM 2002, pp. 57-65.*

Roure et al., Investigating Link Service Infrastructures, ACM 2000, pp. 67-76.*

* cited by examiner

DEVICE, METHOD, AND COMPUTER PROGRAM PRODUCT FOR GENERATING INFORMATION OF LINK STRUCTURE OF DOCUMENTS

BACKGROUND OF THE INVENTION

1. Field of the Invention

The present invention relates to a technique for generating information regarding a link structure of documents which indicates a link structure for a group of web documents and, in particular, to a technique for handling a case in which a redirection of a document is present.

2. Description of the Related Art

Web documents which exist on the World Wide Web (hereinafter simply referred to as the "WWW") and which are written in HyperText Markup Language ("HTML") form a network structure having each web document as a node by providing links to each other. The network structure is commonly referred to as a hypertext structure or a hyperlink structure.

Various software has been developed for diagrammatically displaying a structure of connection relationship formed by a group of such web documents through links.

For example, Japanese Patent Laid-Open Publication No. Hei 6-149648 discloses a hyper media system which can display data connected by links in units of cards wherein a network diagram is displayed in which arrows connect icons which correspond to the cards to indicate links among the cards.

Japanese Patent Laid-Open Publication Nos. Hei 4-321144 and Hei 10-222415 disclose a system in which a hypertext structure constructed by a group of documents is displayed in a form of a tree structure with each document being a node and each link being an edge of the tree.

On the WWW, there are many instances in which a web document indicated by a certain URL (Uniform Resource Locator) is redirected to a web document at another URL. A redirection is employed in cases, for example, when a web site has been moved. There are various methods of redirection, including, for example, a method for setting a redirection in the web server program itself, a method for incorporating a CGI (Common Gateway Interface) script in the web server to indicate a redirection, and a method for including a description of a redirection in the web document using a meta tag.

Consider a case as shown in FIG. 1 in which a web document B1 indicated in a link description of a web document A as a link destination is redirected to another web document B2. In such a case, the web document B1 either is only present as URL and does not have a document body or includes a simple content such as an explanation of the new URL, and thus, in general, does not have any meaningful content as a link destination. The web document B2 has the content of interest as the link destination.

However, when the related art shown in the above-described references is applied to a link structure of a group of web documents including a redirection, as shown in FIG. 2, although an arrow indicating a link from the web document A to the web document B1 is displayed, the relationship among web documents A and B2 is not displayed. In particular, when no link is described in the web document B1 to the web document B2 (for example, when redirection is set in the web server program), even the indirect link relationship from the web document A through the web document B1 to the web document B2 is not displayed in a method in which presence of inter-document link is detected from the link description within web documents.

SUMMARY OF THE INVENTION

The present invention advantageously provides a device for generating information regarding a link structure of documents which can show a link relationship regarding document contents, even when redirection is employed by one or more of the documents.

According to one aspect of the present invention, there is provided a device for generating information regarding a link structure of documents, the device including a link information collector unit for collecting link information indicating a link between web documents by repeating a process for detecting a link description in a web document and a retrieval process for retrieving a web document at a link destination indicated in the link description from a web server; a redirection detection unit for detecting redirection from a web document on a link destination indicated in the link description within the web document to another web document during the retrieval process; a link adder unit for generating, for each redirection detected by the redirection detector unit, link information indicating a link from the web document including the link description having the web document of the source of the redirection as the link destination to the web document of the destination of the redirection; and a link structure information generator unit for generating link structure information indicating a link structure of web documents based on a group of link information collected by the link information collector unit and a group of link information generated by the link adder unit.

In this description, a "web document" generally refers to a document which is written in a hypertext description language such as HTML. The web document may include a link description describing information for specifying a web document of a link destination according to a rule of the description language. The link structure information is information which forms a basis for diagrammatically displaying a link structure among web documents. The link structure information may be a description of the link relationships among web documents represented by a tree structure or by a hypertext structure.

BRIEF DESCRIPTION OF THE DRAWINGS

Preferred embodiments of the present invention will be described in detail based on the following figures, wherein.

DESCRIPTION OF PREFERRED EMBODIMENTS

Figure 1:
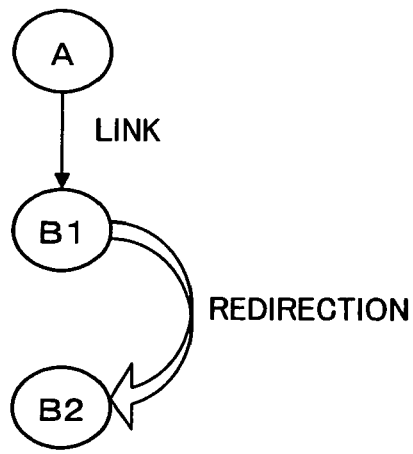
FIG. 1 is a diagram diagrammatically showing one example relationship among web documents which include one or more redirections.
Figure 2:
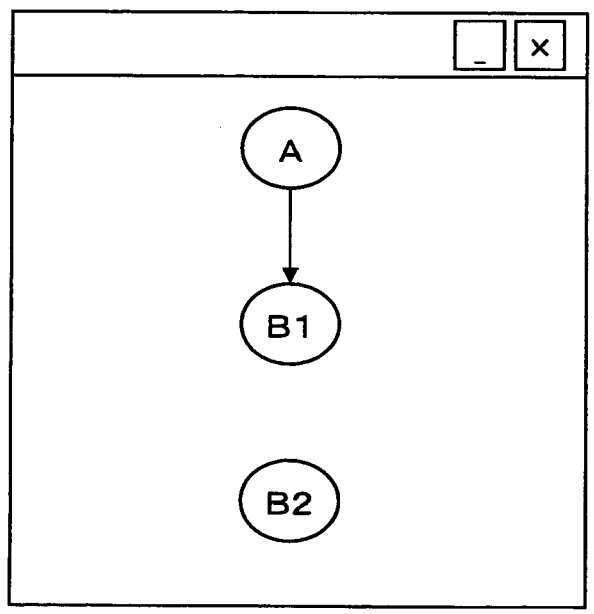
FIG. 2 is a diagram showing an example display window in which the relationship of FIG. 1 is diagrammatically displayed through a method of related art.

Embodiments of the present invention will now be described referring to the drawings.

Figure 3:
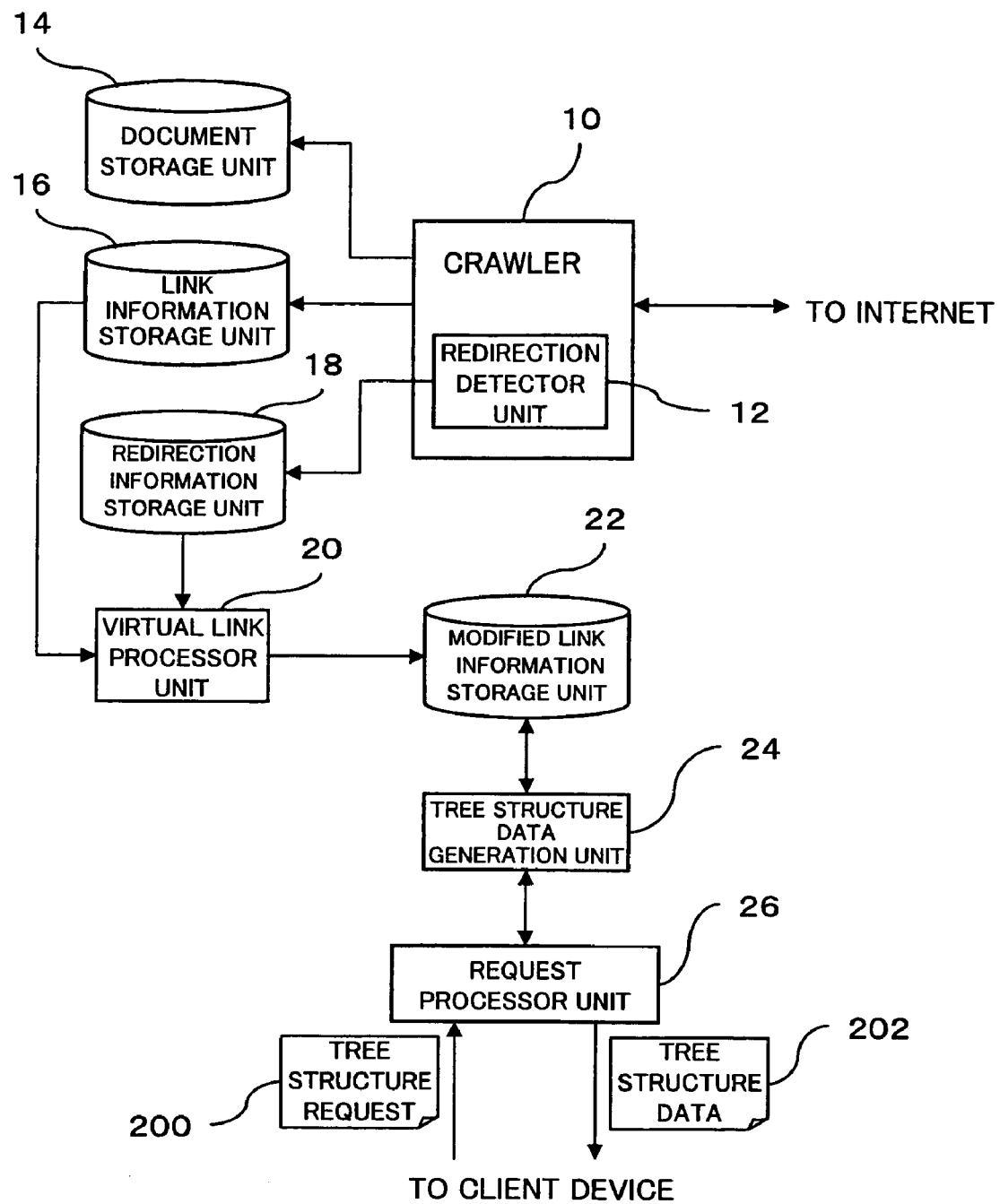
FIG. 3 is a functional block diagram showing an example structure of a device for generating link structure information documents according to one embodiment of the present invention.

FIG. 3 is a functional block diagram showing an example structure of a device for generating information regarding a link structure of documents according to an embodiment of the present invention.

A crawler (also commonly referred to as a "spider" or a "robot") 10 is a functional module for collecting information of links among web documents by following link description within web documents on WWW or on an Intranet within a company. A "web document" is a document described in HTML (HyperText Markup Language) and may hereinafter be simply referred to as a "document" for simplicity.

The crawler 10 analyzes a web document and detects a link description in HTML such as an anchor tag ('<A HREF=" . . . (a word string indicating URL of link destination)">') When the crawler 10 finds a link description, the crawler 10 executes a retrieval process of a document at link destination URL indicated in the link description. In this retrieval process, the crawler 10 issues a retrieval request (such as a GET request) for requesting a document indicated by the link destination URL. When the crawler 10 can retrieve the document from the web server which manages the document at the URL indicated in the request in response to the retrieval request, the crawler 10 executes, on the retrieved document, a detection process of the link and a retrieval process of the link destination as described above. The crawler 10 collects information of the web documents and the link relationship by starting an analysis from at least one web document given as a starting point and repeating detection process of the link description and retrieval process of the link destination. This repetition is called "exploration" of web by the crawler 10. The crawler 10 stores body data (that is, document data written in HTML) of the web document retrieved in this process of exploration in a document storage unit 14 and stores information of links between web documents detected during the process of exploration in a link information storage unit 16. The functions of the crawler 10 described above are similar to those executed by existing crawlers or spiders used by a robot type search engines for collected web documents.

With the exploration process of the crawler 10 as described above, a document table in which management information regarding web documents detected during the exploration process and a link table to which management information regarding detected links are formed in the link information storage unit 16. An example of data content of the document table is shown on FIG. 4 and an example of data content of the link table is shown on FIG. 5.

Figure 4:
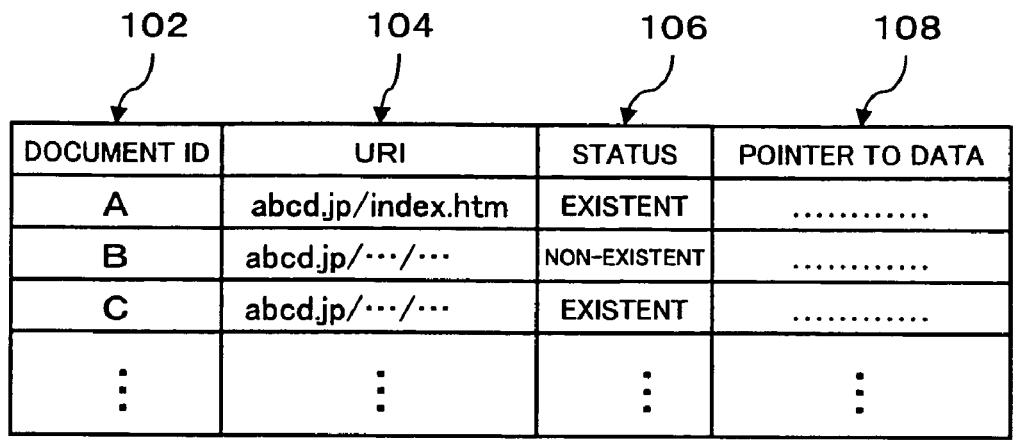
FIG. 4 is a diagram exemplifying data content of a document table formed within a link information storage unit.

As shown in FIG. 4, document table contains, for each detected web document, a unique document ID 102 assigned to the document, URI (Uniform Resource Identifier) 104 of the document (alternatively, it is also possible to use URL), status information 106 indicating whether or not the document exists, and a pointer 108 to the document data stored in the document storage unit 14. The status information 106 is provided for the following reason. During the exploration process by the crawler 10, a web document is detected from URL (or URI) indicated in the link description within another web document, except for the web document given as a starting point. There may be cases, however, that there actually is no web document at the URL (that is, no web document is returned from the web server in response to the retrieval request). Therefore, when the document can be retrieved from the URL of the link description, the status information 106 indicates "existence" and the status information 106 indicates "non-existent" otherwise.

Figure 5:
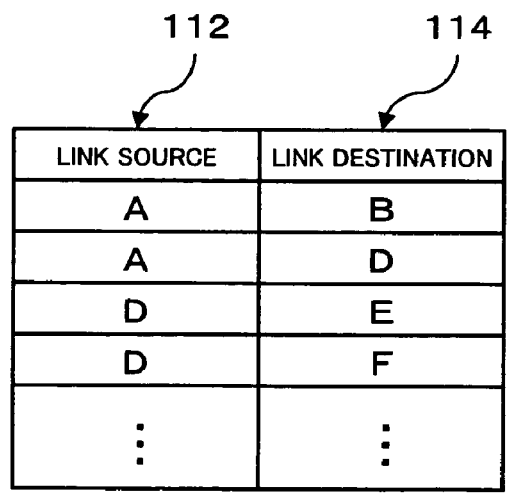
FIG. 5 is a diagram exemplifying data content of a link table formed within a link information storage unit.

As shown in FIG. 5, the link table contains, for each detected link, a document ID of the web document of the link source of the link (link source ID 112) and a document ID of the web document of the link destination (link destination ID 114). FIG. 5 exemplifies an example case in which, for example, link descriptions from a document A to a document B, from the document A to a document to a document D, from the document D to a document E, and from the document D to a document F are detected. When the crawler 10 detects a link description in a web document, the crawler 10 adds a new entry to the link table and registers the document ID of the web document in the link source of the new entry and the document ID of the web document indicated by the URL of the link description into the link destination of the new entry.

In addition to the functions described above, the crawler 10 also has a redirection detector unit 12. The redirection detector unit 12 detects redirection of URL during the processes of detection of the link description and retrieval of the link destination document by the crawler 10. The "redirection" which is the target to be detected includes the following four types:

(1) redirection by setting of a web server program;
(2) redirection which uses CGI (Common Gateway Interface) containing information of redirection destination;
(3) redirection in which URL of redirection destination is described within the link description; and
(4) redirection using a meta tag.

These four methods of redirection will now be described in order. In the description, a configuration of redirection shown in FIG. 1 will be considered.

First, configuration (1) will be described. This method is a method in which a redirection from the URL of the document within a server (redirection source) to another URL (redirection destination) is described in a setting file which is referred to by a web server program. For example, in an Apache server, the redirection is described within a ".htaccess" file.

A flow of redirection detection by the redirect detector unit 12 will now be described. As shown in FIG. 1, when the crawler 10 detects a link description to a document B1 within a document A, the crawler 10 issues a retrieval request indicating the URL of the document B1. When the URL related to the request (document B1) corresponds to a redirection source set in the setting file as described above, a web server receiving this request returns, to the crawler 10, a response containing a status code (in the case of HTTP/1.1) such as 301 (Moved Permanently), 302 (Moved Temporarily), and 303

(See Other) and a Location field including the URL of the redirection destination, according to the setting in the setting file. In the example configuration of FIG. 1, a response containing the URL of a document B2 in the Location field is returned to the crawler 10. The redirection detector unit 12 of the crawler 10 recognizes from the status code and Location field of this response that the requested link destination URL is redirected and the URL of the redirection destination (document B2). The redirection detector unit 12 stores, in the redirection information storage unit 18, redirection information which indicates, as the "redirection source", the URL of the link destination for which a retrieval request has been issued (document B1) and, as the "redirection destination", the URL of the redirection destination indicated in the response from the web server (document B2).

Figure 6:
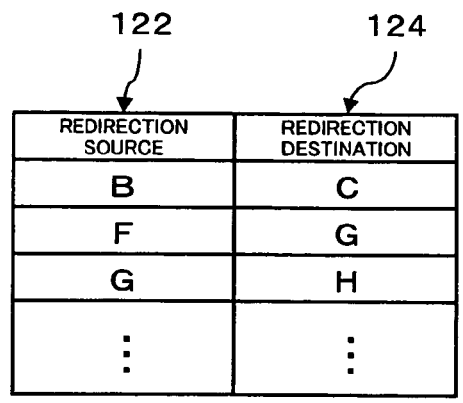
FIG. 6 is a diagram exemplifying data content of a redirection table formed within a redirection information storage unit.

FIG. 6 is a diagram showing an example of data structure of a redirection table to be stored in the redirection information storage unit 18. As shown in FIG. 6, the redirection table contains, for each detected redirection, a document ID of the web document of the redirection source (redirection source ID 122) and a document ID of the web document of the redirection destination (redirection destination ID 124). When the redirection detector unit 12 detects a redirection, the redirection detector unit 12 adds a new entry to the redirection table and registers the document IDs 122 and 124 of the redirection source and redirection destination in the new entry.

Next, the above-described configuration (2) will be described. In this method, a CGI program or script for redirection is incorporated within the web server. This configuration corresponds to, for example, a case in which the document B1 in the example configuration of FIG. 1 is a CGI program for redirection. In this CGI script, for example, a process is described for generating a response containing the URL of the redirection destination document B2 in the Location field. When the web server receives a retrieval request from the crawler 10 for the document B1, the web server calls the document B1 which is a CGI program, and transfers, to the CGI program, parameters for the CGI program if such parameters are present within the retrieval request. The CGI program receives these data, generates a response containing the URL of the document B2 in the Location field, and returns the response to the web server. When the web server returns this response to the crawler 10, the redirection detector unit 12 of the crawler 10 detects, based on the response, that there had been a redirection and registers the redirection source and redirection destination of the redirection in the redirection table. The process by the redirection detector unit 12 in this case is similar to the case of the above-described configuration (1).

Next, the above-described configuration (3) will be described. In this case, URL of redirection destination (from the link destination) is contained as a parameter in the link description within the document A, in addition to the URI of the link destination. An example of such a link description would be "http://foo.bar.baz/log.?redirect=http://foo.bar.baz/b2.html". In this example, the word string described after "?redirect=" indicates the URL of the redirection destination. This configuration achieves a redirection using a CGI script similar to the above-described configuration (2), but is different from the configuration (2) in that the redirection destination is contained in the link description. When the crawler 10 issues a retrieval request with respect to URL containing such redirection destination information, a web server managing this URL calls the CGI program indicated by the URL within the retrieval request and transfers the parameters in the URL to the CGI program. The CGI program retrieves the document B2 at the redirection destination URL indicated by the parameters and the web server returns the document B2 to the crawler 10.

When this method is employed, the redirection detector unit 12 of the crawler 10 can recognize whether or not a redirection is present and, when there is redirection, the redirection destination URL, by analyzing the link description of the document A. That is, because the redirection detector unit 12 stores a format of description of parameters indicating the redirection destination, when the redirection detector unit 12 recognizes a description that matches the stored format of description from the link description to be analyzed, the redirection detector unit 12 recognizes that there is redirection. Similar to the configuration (1), the redirection detector unit 12 registers, in the redirection table, redirection information having the link destination indicated by the link description as a redirection source 122 and the URL of the redirection destination contained in the link description as the redirection destination 124.

Next, the above-described configuration (4) will be described. In this method, a meta tag indicating a redirection content is incorporated within the web document. An example of such a meta tag would be '<meta http-equiv="refresh" content="3, http://foo.bar.baz/b2.html>'. In this example configuration, "http://foo.bar.baz/b2.html" in the parameters shown by "content=" is the URL of the redirection destination.

Consider a case in which such a meta tag (in which document B2 is set as the redirection destination) is contained in a document B1 in the example configuration of FIG. 1. When the crawler 10 sends a retrieval request for the document B1 to the web server based on the link description within the document A, the web server sends the document B1 to the crawler 10. The redirection detector unit 12 of the crawler 10 analyzes the HTML description of the document B1 and detects the meta tag for redirection. When the crawler 10 detects a meta tag for redirection, the crawler 10 recognizes that the document B1 is redirected to a document B2 based on the description of the meta tag and registers the redirection information in the redirection table of the redirection information storage unit 18 similar to the configuration (1).

In addition to the configurations described above, there is another method which can be considered as one type of redirection in a broad sense, in which, in response to a retrieval request for a document B1, a server returns a web document B1 simply having a message for notifying moving such as, for example, "this page has been moved to XXX" (XXX represents the URL of the moving destination B2). In a web document browsing using a browser, when this type of document B1 is returned from a web server, the user will instruct the browser to retrieve the document B2 which is the redirection destination by clicking the URL shown in the document B1 or by inputting the URL of the document B1 into the URL input column of the browser. In other words, this process is a manual redirection. Such a manual redirection also can be automatically detected by the redirection detector unit 12 to a certain degree. For example, it is possible to register several linguistic characteristics of messages indicating moving of a webpage (for example, presence of a description of "is moved to" or similar expressions in front of the word string of URL) in the redirection detector unit 12 and to allow the redirection detector unit 12 to perform a natural language analysis of the description of the text of the web document retrieved from the web server. When the redirection detector unit 12 determines that the description of the text satisfies the registered characteristics, the redirection detector unit 12 judges that the web document indicates redirection. When the redirection detector unit 12 determines that the web document is a web document which contains a message of moving, the redirection detector unit 12 registers, in the redirection table, redirection information containing the web document as the redirection source 122 and the document at the URL indicated in the message as the redirection destination 124.

The operation of the redirection detector unit 12 has been described. As the crawler 10 explores the web, the redirection detector unit 12 detects redirection and registers information on the detected redirection in the redirection information storage unit 18 through operations as described above. When the crawler 10 completes web exploration after satisfying a predetermined completion condition, the link information storage unit 16 contains the information of each document detected in the exploration (document table; FIG. 4) and information on each link (link table; FIG. 5) and the redirection information storage unit 18 contains the information of each redirection detected during the exploration (redirection table; FIG. 6).

A virtual link processor unit 20 determines an effective link relationship among documents considering the redirection based on the information stored in the link information storage unit 16 and in the redirection information storage unit 18. The virtual link processor unit 20 then modifies the information of the link structure determined from the link description within web documents (that is, the link table stored in the link information storage unit 16) according to the information of the determined effective link relationship.

The most important modification is an addition of a link reflecting the redirection. More specifically, when the document B1 of a link destination indicated in a link description within a certain document A is redirected to another document B2 as shown in FIG. 1, a link is added from the document A including the link description to the redirection destination document B2. In an embodiment of the present invention, information indicating a virtual link is added to this type of link added corresponding to the redirection in order to distinguish this type of links from a type of links indicated in the link description detected by the crawler 10 within the document. In the following description, a link indicated by a link description will be called a "real link" and a link added by the virtual link processor unit 20 will be called a "virtual link".

There are some cases, for example, in which a redirection destination document is further redirected to another document such as in the case shown in FIG. 6 in which a document G which is redirected from the document F is further redirected to another document H. When, as in this example, there is a chain of redirections, the virtual link processor unit 20 does not add virtual links corresponding to the redirections within the chain, but rather, add a virtual link to the ultimate redirection destination.

For example, in a configuration comprising the link table as shown in FIG. 5 and the redirection table as shown in FIG. 6, a document F which is a link destination of a document D is redirected to a document G which is further redirected to a document H. When the document H is not redirected and has a real content, the virtual link processor unit 20 adds only a virtual link from the document D to the document H which is the ultimate redirection destination, and does not add virtual links from document D to document F or from document D to document G.

The virtual link processor unit 20 executes the addition process of the virtual link referring to the link table in the link information storage unit 16 and the redirection table in the redirection information storage unit 18. The virtual link processor unit 20 follows the following procedures, for example.

The virtual link processor unit 20 compares the link destination 114 of each link information in the link table with the redirection source 122 in each redirection information in the redirection table and finds a pair of link information and redirection information which match each other. The virtual link processor unit 20 then generates a virtual link from the link source 112 of the link information in this pair to the redirection destination 124 of the redirection information in this pair.

When there is redirect information having a redirection source which matches the link destination of the virtual link thus generated (this virtual link will hereinafter be called "virtual link X" for purpose of description) within the redirection table, a virtual link Y from the link source of the virtual link X to the redirection destination of the redirection information is generated, and the original virtual link, virtual link X, is deleted. By repeating this process, only a virtual link from the link source to the ultimate redirection destination without further redirection will remain.

Alternatively, the virtual link from the link source to the ultimate redirection destination can also be realized through the following process. In this process, it is determined as to whether or not there is a combination in which the redirection destination 124 of certain redirection information U matches the redirection source 122 of another redirection information V within the redirection table, and, when there is such a combination, the two redirection information are contracted and replaced with one redirection information from the redirection source 122 of the redirection information U to the redirection destination 124 of the redirection information V. It is possible to repeatedly apply, before comparing between the link table and the redirection table, this process until redirection table does not further change, to contract the redirection table, and then apply the comparison process as described above to the redirection table and the link table.

In an embodiment of the present invention, when the virtual link processor unit 20 generates a virtual link from a link table of the link information storage unit 16, the virtual link processor unit 20 deletes the real link having the redirection source of the redirection as its link source. This real link is a link to a document which is redirected and which does not have a real content. Therefore, from the point of view of the user seeing the link structure, it is more desirable to delete this real link for ease of reading the connection between documents with actual contents. This deletion may be achieved by literally deleting the link information indicating the real link, or, alternatively, may be achieved by substantially deleting the link information by adding information indicating that the link information is invalid. The latter configuration will be called "effective deletion" in the specification.

The processes by the virtual link processor unit 20 have been described. The virtual link processor unit 20 executes the above-described processes using the tables in the link information storage unit 16 and in the redirection information storage unit 18 after the crawler 10 completes web exploration. The virtual link processor unit 20 outputs the result of the process to a modified link information storage unit 22.

Figure 7:
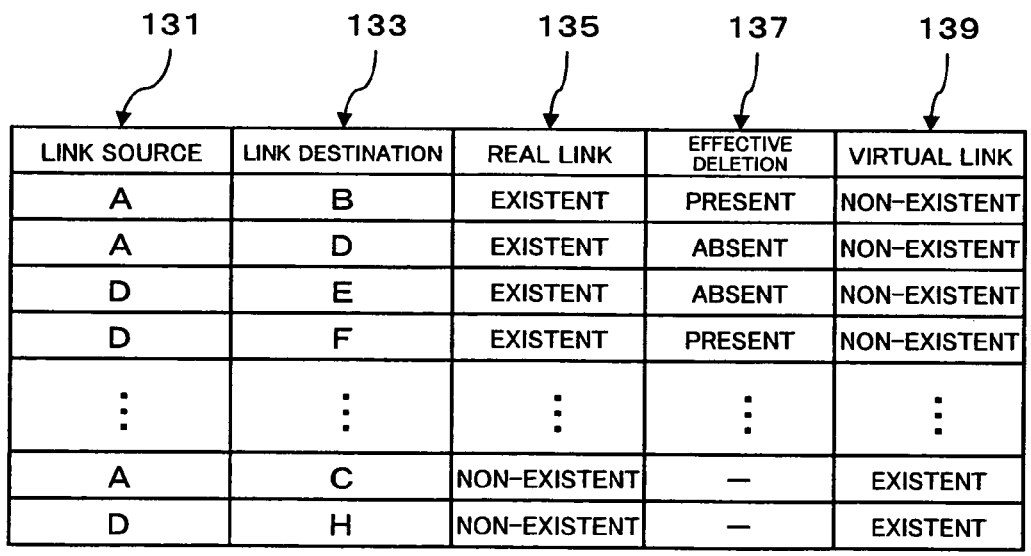
FIG. 7 is a diagram exemplifying a link table after modification which is stored in a modified link information storage unit.

FIG. 7 shows an example of a modified link table to be stored in the modified link information storage unit 22. This table contains, for each link, link information including a link source ID 131, a link destination ID 133, real link status information 135, effective deletion information 137, and virtual link status information 139.

The link source ID 131 and the link destination ID 133 are IDs of web documents of the link source and link destination of the corresponding link.

The real link status information 135 and the virtual link status information 139 are, respectively, information which indicates status of the real link and of the virtual link between the link source and the link destination. As described above, the real link is a link indicated in the link description in a web document retrieved by the crawler 10 (or the web document at the starting point) and the virtual link is a link generated by the virtual link processor unit 20 by connecting a link source and the redirection destination which is ultimately reached via at least one redirection from the link destination. It is not necessary to distinguish the real link and the virtual link, if all that is desired is to simply display the link relationship. In an embodiment of the present invention, however, in order to allow processes such as distinctive display of the real link and the virtual link, the status of links of both types are individually stored in the modified link table. The status information 135 and 139 indicates "existence" or "non-existence" of the link. There may be cases in which both a real link and a virtual link are present between the same link source and link destination.

FIG. 7 shows an example of a modified link table generated from the link table of FIG. 5 and the redirection table of FIG. 6. The real link status information 135 in the table of FIG. 7 for the links shown in FIG. 5 indicate "existence" and the corresponding virtual link status information 139 indicate "non-existence". Similarly, regarding the virtual links from the document A to document C and from the document D to document H generated in consideration of redirection shown in FIG. 6, the virtual link status information 139 indicates "existence" and the real link status information 135 indicates "non-existence".

The effective deletion information 137 is information which indicates as to whether or not the corresponding link is "effectively deleted" by the virtual link processor unit 20. More specifically, in the example configuration of FIG. 7, when a document at a link destination of a certain real link is redirected to another document, the virtual link processor unit 20 sets "presence" of effective deletion as the "effective deletion" information 137 for the real link to effectively delete the real link. On the other hand, the "effective deletion" information 137 for a real link which is not effectively deleted is set as "absent". In the example configuration of FIG. 7, the real links from the document A to document B and from the document D to document F are effectively deleted. When a link is to be deleted, although it is possible to delete the entry itself of the link from the link table, in the shown example configuration, the deletion of the link is expressed by the information in the effective deletion information 137 and the entry of the information itself is maintained. This configuration has an advantage in that because the information of the real link is described in the web document itself, the information of the real link may be useful for an analysis concerning a link structure of documents if it is maintained.

In this manner, the virtual link processor unit 20 generates a modified link table within a modified link information storage unit 22 and stores the document table within the link information storage unit 16 in the modified link information storage unit 22.

A tree structure data generator unit 24 determines a tree structure of the group of web documents based on the modified link table and the document table within the modified link information storage unit 22. Specifically, although the information stored in the modified link information storage unit 22 has a hyperlink structure including the group of web documents, the tree structure data generation unit 24 converts the hyperlink structure to a tree structure. The tree structure data generator unit 24 determines a tree structure including the group of web documents by following links within the modified link table in which the real link information 135 or the virtual link information 139 is "existent" from one or more web documents designated as a starting point through a depth-first search or a breadth-first search. The tree structure data generator unit 24 then generates tree structure data indicating the determined tree structure. A method for generating a tree structure from a hyperlink structure has been proposed in various ways including the above-described Japanese Patent Laid-Open Publication Nos. Hei 4-321144 and Hei 10-222415, and therefore the tree structure data generator unit 24 may use these related art.

The tree structure data generator unit 24 has, as one operation mode, a mode in which the effective deletion information 137 in a table of the modified link information storage unit 24 (FIG. 8) is referred to so that the links in which there is "effective deletion" are excluded from the search target during the generation of the tree structure. When this mode is selected, the links which are effectively deleted with respect to redirection are excluded from the tree structure data.

Figure 8:
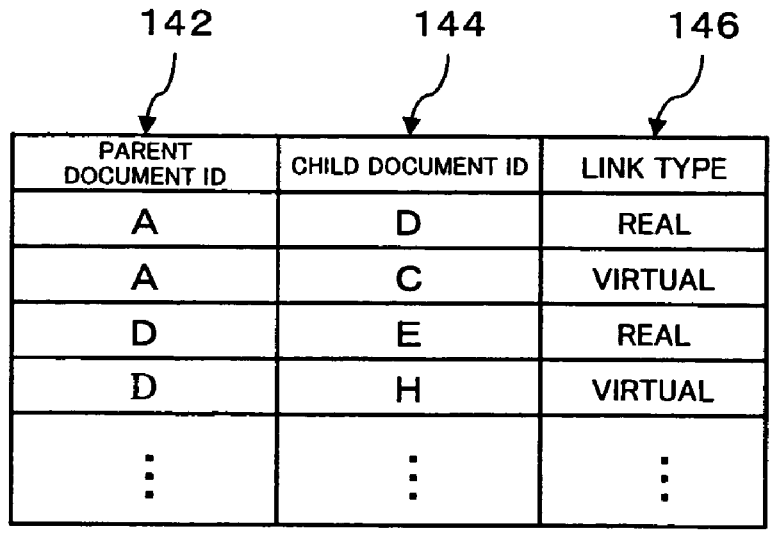
FIG. 8 is a diagram exemplifying tree structure data generated by a tree structure data generator unit.

FIG. 8 is a diagram showing example tree structure data generated by the tree structure data generator unit 24, The tree structure data includes a parent document ID 142, a child document ID 144, and a link type 146. One entry (one line) of the tree structure data represents a parent-child relationship within the tree structure of web documents. For example, the entry at the first line of FIG. 8 indicates that the document A has documents D as its child in the tree structure. The link type 146 indicates whether the link of the parent-child relationship is a real link or a virtual link. This information of the link type 146 may be used for, for example, distinguishing a real link and a virtual link among the links of parent-child relationship on the display format when the tree structure is displayed.

When the links which have been effectively deleted are to be also included in the tree structure, it is desirable to add a data item which indicates whether or not the link of the parent-child relationship is effectively deleted. In this manner, a device for diagrammatically displaying the tree structure data may refer to this item and distinguish the effectively deleted links and other links on the display. For example, it is possible to display the effectively deleted link and the document at the link destination of such a link with a lighter color.

A request processor unit 26 is a functional module which receives and processes a request for a tree structure data (tree structure data request 200) from a client device via a data communication network such as LAN (local area network) and the Internet to the device for generating information concerning a link structure of documents. When the request processor unit 26 receives a tree structure data request 200 from a client device, the request processor unit 26 instructs the tree structure data generator unit 24 to generate tree structure data 202 and transmits the generated tree structure data to the client device. The client device interprets the tree structure data to diagrammatically display a tree structure in which a web document is represented by a node and a parent-child relationship between documents is represented by an edge between nodes. It is also possible to employ a configuration in which the tree structure data generator unit 24 generates image data indicating a diagram of a tree structure based on the tree structure data 202 and provides the image data through the request processor unit 26 to the client device. In addition, by employing a configuration in which the request processor unit 26 provides a document table indicating correspondence between IDs and URL of web documents (refer to FIG. 4) to the client device in association with the tree structure data 202, it is possible for the client device to, for example, display the web document corresponding to a node selected by a user on the displayed tree-structure by retrieving the web document through HTTP using the URL corresponding to the selected node. In this case, it is also possible to employ a configuration in which the status information 106 of the document table is referred to during when a tree structure is to be displayed so that the documents of "non-existence" are not displayed as nodes.

It is also possible to designate, in the tree structure data request 200, the URL of one or plural web documents to be used as a starting point of the tree structure to be generated by the tree structure data generator unit 24. In this case, the request processor unit 26 has a function to provide an input screen for allowing an input of the URL of the web document(s) to be used as the starting point, to the client device as a web document. A user operating the client device inputs the URL of the web document to be used as a starting point on the input screen. After this input is completed and the user selects a submit button provided on the input screen, data of a tree structure request 200 including input URLs is transmitted from the client device to the device for generating information regarding a link structure of documents. The request processor unit 26 receives this request and transfers the request to the tree structure data generator unit 24, and the tree structure data generator unit 24 generates the tree structure data with the starting point indicated in the request as a root, based on the information within the modified link information storage unit 22.

Figure 9:
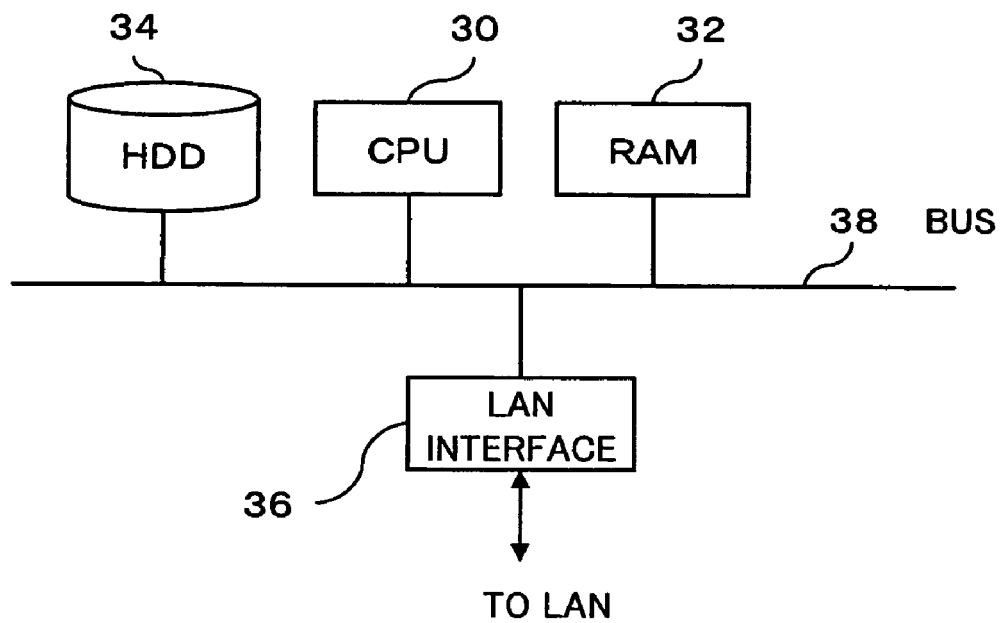
FIG. 9 is a diagram exemplifying a hardware structure which forms a basis for a device for generating link structure information according to an embodiment of the present invention.

An example configuration of functions of the device for generating information regarding a link structure of documents according to the present invention has been described. Such a device for generating information concerning a link structure of documents may be constructed using a typical computer system. As shown in FIG. 9, a typical computer system includes, for example, a CPU (central processing unit) 30, a RAM (random access memory) 32, an HDD (hard disk drive) 34, and a LAN interface 36, which are connected through a bus 38. By installing program(s) in which functions of each of the functional modules 10, 12, 20, and 24 of FIG. 3 is described on the HDD 34 of the computer system of FIG. 9, it is possible to realize a device for generating information concerning a link structure of documents shown in FIG. 3. The functions described above can be realized by the CPU 30 executing the program(s) using the RAM 32. This device is connected via the LAN interface 36 to a local area network and to the Internet, and therefore, can receive the tree structure request 200 from client devices over the LAN or the Internet.

As described, in the present embodiment, first, the redirection of web documents is monitored during the exploration process, and, when redirection of a link destination of a certain link source document is detected, a new link from the link source document to the redirection destination document is added. In this manner, it is possible to present to users links indicating connection regarding document contents.

In addition, in the present embodiment, when a link from the link source document to the redirection destination document is added, the link from the link source document to the link destination document (that is, the redirection source of the redirection) is substantially deleted. In this manner, it is possible to omit, from the display of a tree structure for a user, links to redirection source documents which in general have no document or substantially no document content. Because the redirection source document is only temporarily seen by the user (web viewer) during the redirection (or is never seen by the user), the significance of recognition of the redirection source document by the user is low. Therefore, by omitting these links from the display of a tree structure, it is possible to provide a display which is easily understandable by a user.

Figure 10:
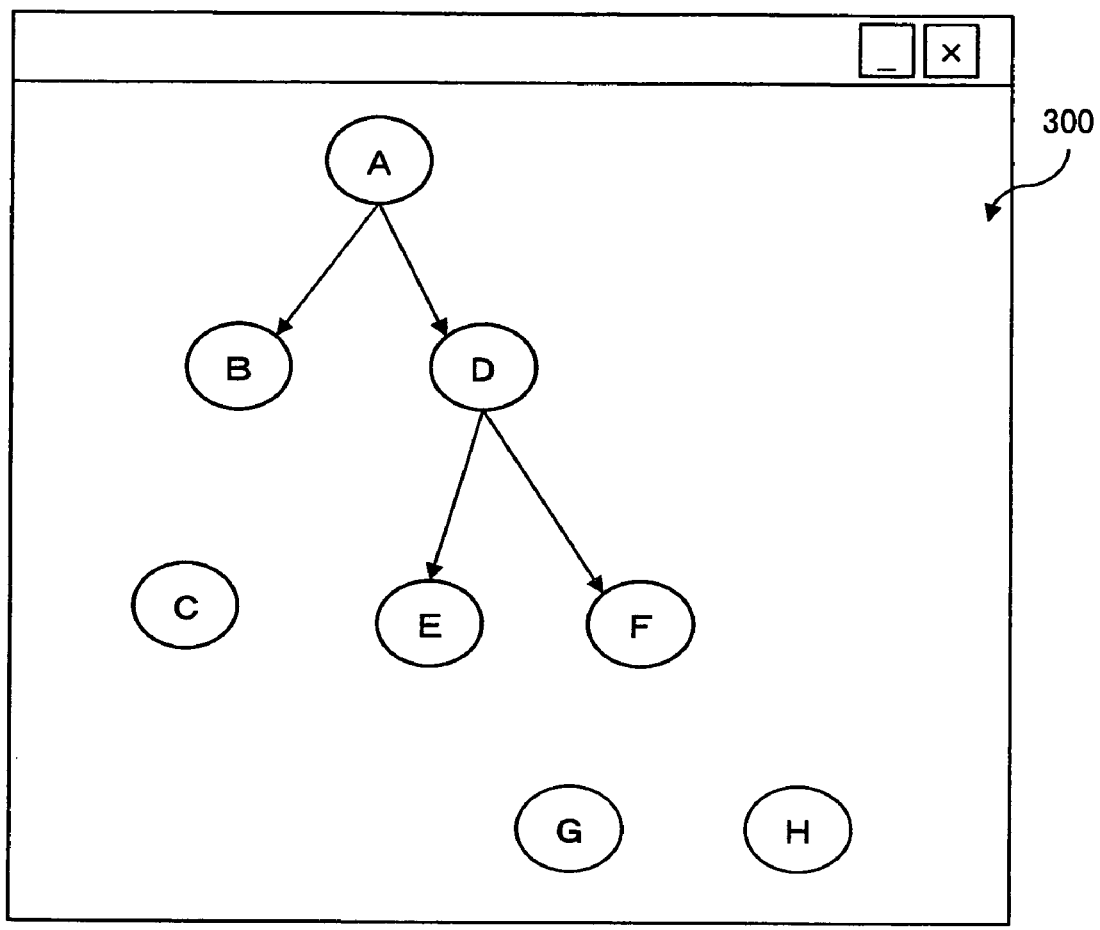
FIG. 10 is a diagram exemplifying a tree structure display according to a method of related art.
Figure 11:
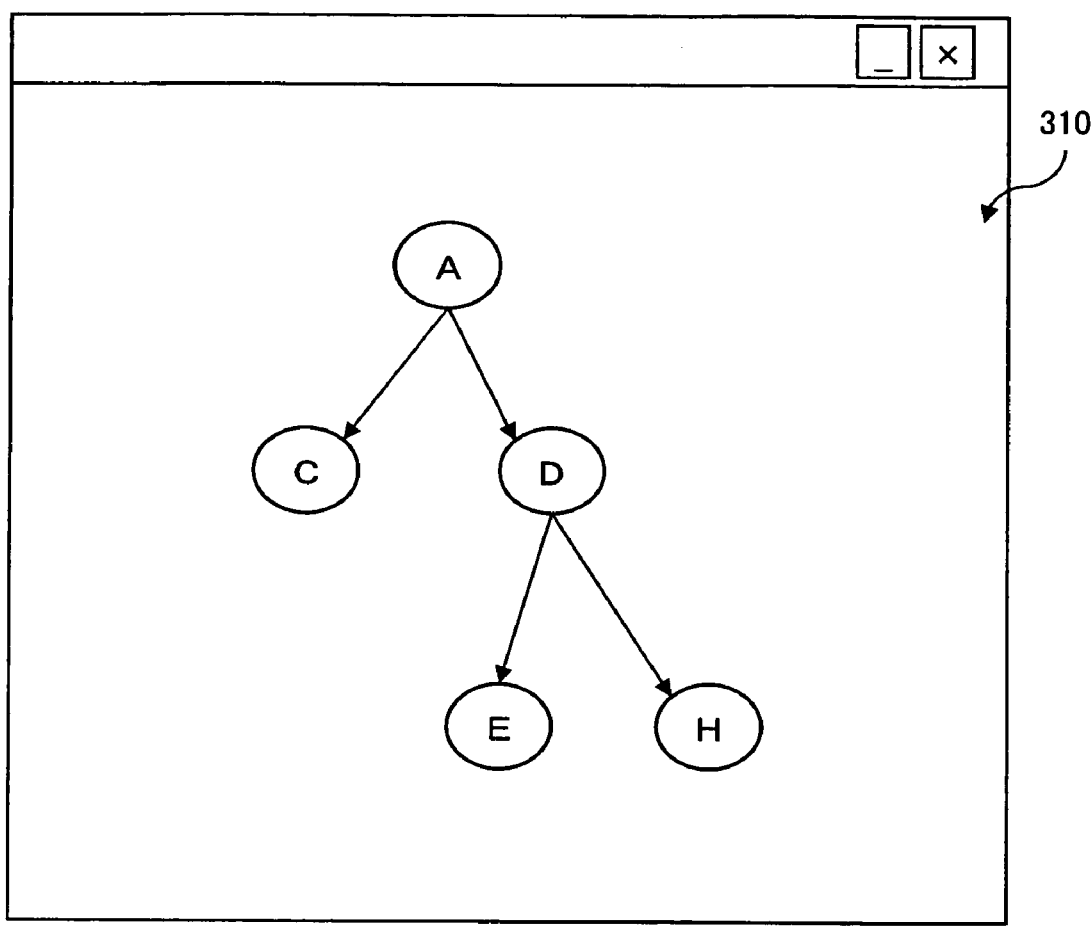
FIG. 11 is a diagram exemplifying a tree structure display according to one embodiment of the present invention.

For example, when the situation of links determined from link description of web documents is as shown in FIG. 5 and redirection is performed as shown in FIG. 6, with the method of the related art, links which are directly described in link description in web documents such as a link from the document A to the document B and a link from the document D to the document F would be shown in a tree display window 300 shown in FIG. 10, and the relationship between the documents A and C and between the document D and H which respectively are content-wise connected would not be shown. To the contrary, according to the present embodiment, the relationship between the document A and C and between the documents D and H which are respectively content-wise connected can be displayed as shown in a tree display window 310 of FIG. 11, and, at the same time, it is possible to not display, in the tree structure, the link to the document B which does not have any content as a link destination and the link to the document F which also does not have any content as a link destination.

In the present embodiment, by including information indicating whether each link is a real link or a virtual link in the tree structure data, it is possible to display these types of links in different display format when the tree structure is displayed.

In the present embodiment, when a link destination indicated by a link description in a certain document is redirected to an ultimate redirection destination through a chain of redirections, only a link from the document to the ultimate redirection destination is included in the tree structure. With this structure, links to documents on the way to the redirection destination can be omitted and it is possible to display only the links which show connection regarding the substantial content.

The above-described embodiments are described only for the purpose of exemplification, and the present invention should not be construed as being limited to the above-described examples. Various modifications may be made to the above-described embodiments within the spirit and scope of the present invention.

For example, in the above-described examples, the link added based on the redirection information is called a virtual link and is distinguished from a real link which is a link directly indicated in link description in a web document. Alternatively, if the real and virtual links are not to be distinguished on the display, it is possible to handle both types of links without a distinction. In this case, items of the real link status information 135 and the virtual link status information 137 in the modified link table of FIG. 7 are not necessary and the information on the link type in the tree structure data of FIG. 8 is also not necessary.

Figure 12:
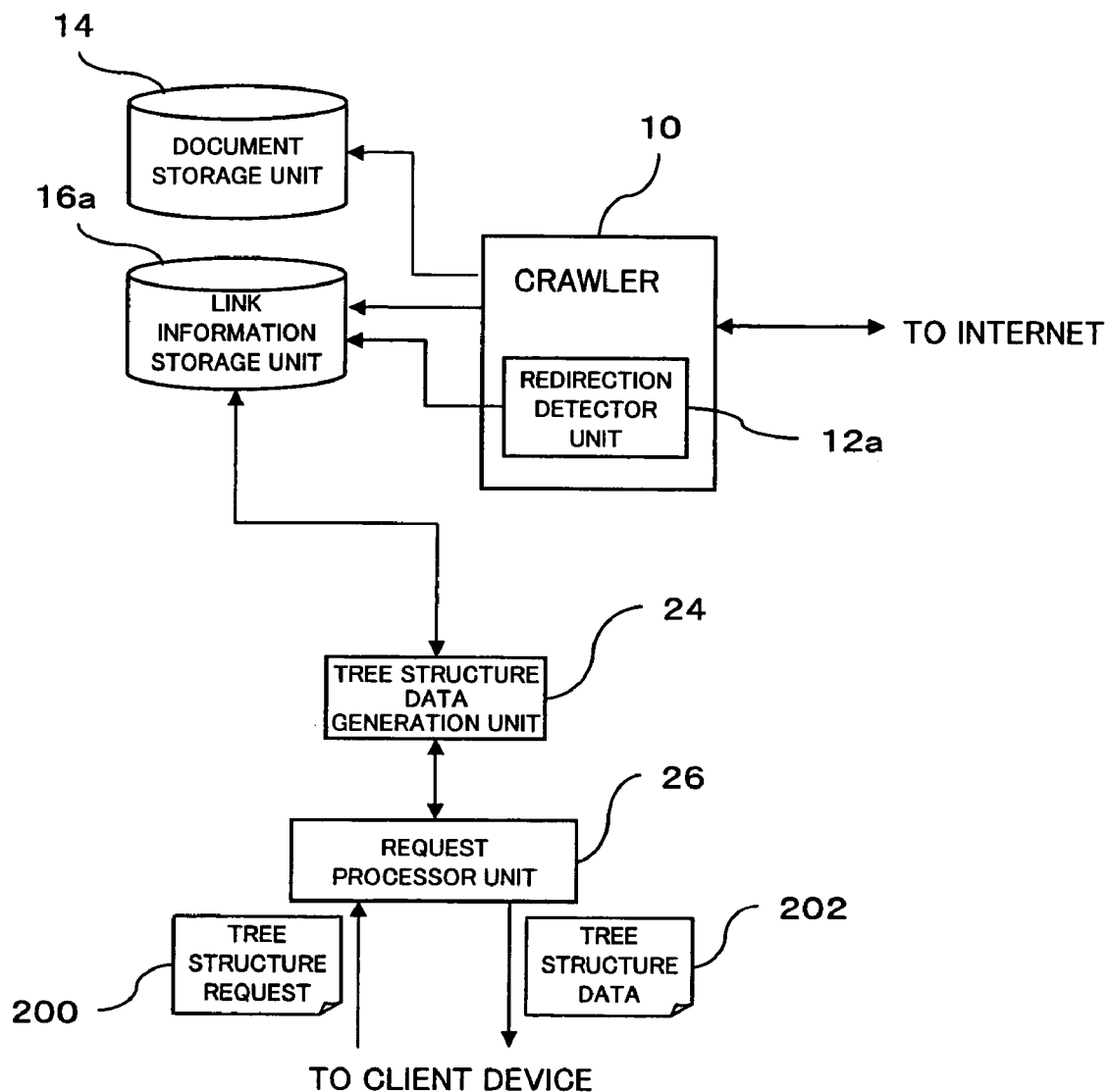
FIG. 12 is a functional block diagram exemplifying a structure of a device for generating information regarding a link structure of documents according to another embodiment of the present invention.

In addition, in the above-described embodiment, the virtual link processor unit 20 adds or deletes links reflecting the redirection based on the information in the link information storage unit 16 and in the redirection information storage unit 18 after the crawler 10 and the redirection detector unit 12 complete exploration. Alternatively, it is also possible to add or delete links simultaneously with the web exploration by the crawler 10. For example, as shown in FIG. 12, each time the redirection detector unit 12a detects redirection through the exploration process by the crawler 10, the redirection detector unit 12a can determine, from link table in a link information storage unit 16a, link information having the redirection source of the detected redirection as a link destination and can add, to the link table, a link from the link source of the link information to the redirection destination of the redirection.

In this case, if the device is in a mode in which the link in the midway of redirections are not to be shown in the tree structure, it is possible to delete, from the link table, the link information having the redirection source as the link destination.

In addition, in the above-described embodiment, tree structure data for displaying the relationship between web documents in a tree structure is generated. The present invention, however, is not limited to the generation of the tree structure data. For example, the present invention can be applied to a case when data is to be generated for displaying a hypertext structure (network structure) between web documents. In this case, the modified link table formed in the modified link information storage unit 22 can be used as a table representing a hypertext structure.

According to one aspect of the present invention, it is preferable that the device for generating information concerning a link structure of documents further includes a link deletion unit for substantially deleting, from the group of link information collected by the link information collector unit, link information having, as a link destination, the web document of the redirection source of the redirection detected by the redirection detector unit, and the link structure information generator unit generates link structure information based on a group of link information after a deletion process is applied by the link deletion unit.

Here, the "substantial deletion" of link information includes both cases of literal deletion of the link information and of recording of information indicating that the link information is invalid in association with the link information.

According to another aspect of the present invention, it is preferable that, when a link destination indicated in a link description in a web document is destined through redirections to a web document at an ultimate redirection destination which is not further redirected, the link adder unit generates link information indicating a link from the web document including the link description to the web document of the ultimate redirection destination.

The disclosure of Japanese Patent Application No. 2003-398989 filed on Nov. 28, 2003 including specification, claims, drawings, and abstract is incorporated herein by reference in its entirety.

What is claimed is:

1. A method for generating link structure information indicating a link structure formed by web documents, comprising:
  (a) collecting link information indicating a link between a first web document and a second web document by repeating a process for detecting a link description in the first web document and a retrieval process for retrieving the second web document at a link destination indicated in the link description from a web server;
  (b) detecting redirection from the second web document on a link destination indicated in the link description in a web document to a third web document during the retrieval process;
  (c) generating, for each redirection detected in step (b), virtual link information indicating a link from the first web document including a link description having, as the link destination, the web document of the source of the redirection directly to the third web document of the destination of the redirection; and
  (d) generating link structure information indicating a link structure among web documents based on link information collected in step (a) and the virtual link information generated in step (c), generating image data representing the generated data structure information, and outputting the generated image data, wherein the link information and the virtual link information are displayed in different manners from each other in the generated image data.

2. The method for generating link structure information according to claim 1, further comprising:
  (e) substantially deleting, from the group of link information collected in the step (a), link information having, as a link destination, the web document of the source of the redirection detected in the step (b); and
  (f) generating link structure information indicating a link structure among web documents based on link information after the deletion is applied in the step (e).

3. The method for generating link structure information according to claim 1, wherein
  in the step (c), when a link destination indicated by a link description in a web document is destined through a plurality of redirections to a web document of an ultimate redirection destination which is not further redirected, link information indicating a link from the web document containing the link description to the web document of the ultimate redirection destination is generated.

4. The method for generating link structure information according to claim 1, wherein
  in the step (b), the web document of the redirection destination is specified based on data in Location field contained in a response from the web server during the retrieval process.

5. The method for generating link structure information according to claim 1, wherein
  in the step (b), a web document of the redirection destination is specified by detecting redirection destination information of a predetermined format contained in the link description.

6. The method for generating link structure information of claim 1, wherein step (b) comprises detecting redirection by setting of a web server program, redirection using a common gateway interface, redirection in the link description, and redirection using a meta tag.

7. A computer program product embodied on one or more computer readable media, for generating link structure information indicating a link structure formed by web documents, the computer program product comprising:
  a computer readable program code for collecting link information indicating a link between a first web document and a second web document by repeating a process for detecting a link description in the first web document and a retrieval process for retrieving the second web document of the link destination indicated in the link description from a web server;
  a computer readable program code for detecting redirection from the second web document to a third web document of a link destination indicated in the link description;
  a computer readable program code for generating, for each detected redirection, virtual link information indicating a link from the first web document containing a link description having, as the link destination, the web document of the source of the redirection directly to a third web document of the destination of the redirection; and
  a computer readable program code for generating link structure information indicating a link structure in web documents based on a group of collected link information and a group of generated virtual link information, that generates image data representing the generated data structure information, and that outputs the generated image data, wherein the link information and the virtual link information are displayed in different manners from each other in the generated image data.

8. A device for generating information concerning a link structure of documents, the device comprising:

a storage medium that stores data related to the generating process;

a link information collection unit that collects link information indicating a link between a first web document and a second web document, by repeating a process for detecting a link description in the first web document and a retrieval process for retrieving the second web document indicated in the link description from a web server;

a redirection detecting unit that detects redirection from the second web document to a third web document during the retrieval process;

a virtual link generation unit that generates virtual link information indicating a link from the first web document directly to the third web document; and a link structure generating unit that generates link structure information indicating a link structure of web documents based on a group of link information collected by the link information collecting unit and a group of virtual link information generated by the virtual link generation unit, that generates image data representing the generated data structure information, and that outputs the generated image data, wherein the link information and the virtual link information are displayed in different manners from each other in the generated image data.

9. The device for generating information concerning a link structure of documents according to claim 8, further comprising:

means for substantially deleting, from the group of link information collected by the link information collecting unit, link information having, as a link destination, the web document of the source of the redirection detected by the redirection detecting unit, wherein the link structure generating unit generates the link structure information based on a group of link information after a deletion process is applied by the means for substantially deleting link information.

10. The device for generating link structure information according to claim 8, wherein when the link destination indicated in a link description in a web document is destined through a plurality of redirections to a web document at an ultimate redirection destination which is not further redirected, the virtual link generation unit generates link information indicating a link from the web document including the link description to the web document of the ultimate redirection destination.

11. The device for generating information concerning a link structure of documents according to claim 8, wherein the redirection detection unit specifies a web document of a redirection destination based on data in Location field contained in a response from the web server during the retrieval process.

12. The device for generating information concerning a link structure of documents according to claim 8, wherein the redirection detection unit specifies a web document on the redirection destination by detecting redirection destination information of a predetermined format contained in the link description.

13. The device according to claim 8, wherein the link information collection unit comprises:

a sending unit that sends, when a link description indicating the second web document is detected in the first web document, an HTTP request for acquiring the second document indicated in the link description to the web server; and an actual link generation unit that generates, when the second document is acquired from the web server in response to the HTTP request, an actual link information indicating a link from the first document to the second document;

wherein, when redirection information from the web server to a third document is detected in response to the HTTP request, the virtual link generation unit generates a virtual link information indicating a direct link from the first document to the third document; and wherein, the link structure generating unit generates link structure information indicating a link structure of web documents based on a group of actual link information generated by the actual link generation unit and a group of virtual link information generated by the virtual link generation unit.

\* \* \* \* \*